United States Patent
Armaly, Jr.

(10) Patent No.: US 8,327,493 B2
(45) Date of Patent: *Dec. 11, 2012

(54) SPONGE PRODUCT

(75) Inventor: John W. Armaly, Jr., Grosse Pointe, MI (US)

(73) Assignee: Armaly Sponge Co., Commerce Township, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/161,134

(22) Filed: Jun. 15, 2011

(65) Prior Publication Data

US 2012/0159729 A1    Jun. 28, 2012

Related U.S. Application Data

(63) Continuation of application No. 11/880,060, filed on Jul. 19, 2007, now Pat. No. 7,996,950.

(60) Provisional application No. 60/831,756, filed on Jul. 19, 2006.

(51) Int. Cl.
*A47L 13/12* (2006.01)
*A47L 13/16* (2006.01)

(52) U.S. Cl. ...... 15/244.3; 15/244.4; 451/523; 451/539; D32/40

(58) Field of Classification Search ................ 15/244.1, 15/244.2, 244.3, 244.4; 451/523, 524, 539; D28/63; D32/40
See application file for complete search history.

(56) References Cited

U.S. PATENT DOCUMENTS

| | | | |
|---|---|---|---|
| 1,966,101 A | 7/1934 | Miller | |
| 3,611,469 A | 10/1971 | Belli | |
| 3,861,993 A | 1/1975 | Guthrie | |
| D473,027 S | 4/2003 | Pecaut | |
| 2001/0000503 A1* | 4/2001 | Beaudry et al. | 451/523 |

* cited by examiner

*Primary Examiner* — Randall Chin
(74) *Attorney, Agent, or Firm* — Bunting Law Group

(57) ABSTRACT

A multi-surface sponge product includes a foraminous portion adhered to an abrasive portion to form a unitary product, each portion and the resulting product having a pair of sidewalk and in cross-section or side elevation having the form of a parallelogram. The sidewalls form gripping areas and the angled forward and reward end opposite ends of the parallelogram shaped body form wedges. The multi-surface body is low profile and various edges and corners thereof enable the foraminous and abrasive portions to be selectively used to engage corners of many differently configured surfaces to be cleaned, to either scrub the surface or simply clean or absorb fluid, depending on which portion of the product is emplaced in the edge or in a corner.

14 Claims, 1 Drawing Sheet

SPONGE PRODUCT

CROSS-REFERENCE TO RELATED APPLICATION

The present application is a continuation of prior U.S. application Ser. No. 11/880,060 titled "Sponge Product," filed Jul. 19, 2007, now U.S. Pat. No. 7,996,950 which claims priority to U.S. Provisional Patent Application No. 60/831,756 titled "Sponge Product," filed Jul. 19, 2006, the entire disclosures of which are incorporated herein by reference.

BACKGROUND

The present invention pertains to cleaning appliances. More particularly, the present invention pertains to household cleaning appliances. Even more particularly, the present invention pertains to sponges having both an abrasive and a sponge portion.

As is known to those skilled in the art to which the present invention pertains, sponges and similar appliances are used for cleaning countertops, sinks, bowls, cars, etc. in just about every type of environment, be it industrial or domestic, household. Typically, a sponge is a foraminous material, whether natural or synthetic. Recently, there has been developed, sold and marketed a unitary cleaning product having both a sponge portion and an abrasive portion.

As is to be readily appreciated one of the problems encountered with this type of product is the inability to effectively reach into corners as well as along edges for effective scrubbing and cleaning.

The prior art has revealed products but none of which are susceptible for effectively cleaning an edge or a corner. See, for example, U.S. Pat. No. 1,966,101, issued Jul. 10, 1934 to Miller; U.S. Pat. No. 3,611,469, issued Oct. 12, 1971 to Belli; U.S. Pat. No. 3,861,993, issued Jan. 24, 1975 to Guthrie; and U.S. Design Patent No. D473,027, issued Apr. 8, 2003 to Pecaut.

As will subsequently be detailed the present invention overcomes the problems in the prior art by providing a sponge product which provides both a foraminous portion as well as an abrasive portion and which can readily reach into corners and edges.

SUMMARY

In accordance herewith there is provided a multi-surface sponge product, which has a foraminous portion and an abrasive portion, which are specially configured and joined to one another to form a unitary assembly in the form of a unitized hand grippable block or body, which in side elevation or cross-section is in the form of a parallelogram.

The foraminous and abrasive portions are in the form of parallel layers and each portion has opposite sidewalls and a cross-section in the form of a parallelogram. The portions or layers are joined together such as by an adhesive and the individual parallelogram cross-sections combined to form a single parallelogram shaped block having angled ends or wedges at the opposite ends thereof formed by respective inclined surfaces of the parallelogram shaped body. Inclined surfaces formed on the respective layers or portions combine and are coplanar. The top and bottom surfaces of the foraminous and abrasive layers are parallel, spaced apart, rectangular shaped, and define edges and corners that may be effectively brought into contact with an edge or corner of a work surface to either scrub the surface or simply clean or observe fluid, depending on which portion of the product is being used.

For a more complete understanding of the present invention reference is made to the following detailed description and accompanying drawing. In the drawing, like reference characters refer to like parts throughout the several views in which:

DETAILED DESCRIPTION

Figure 1:
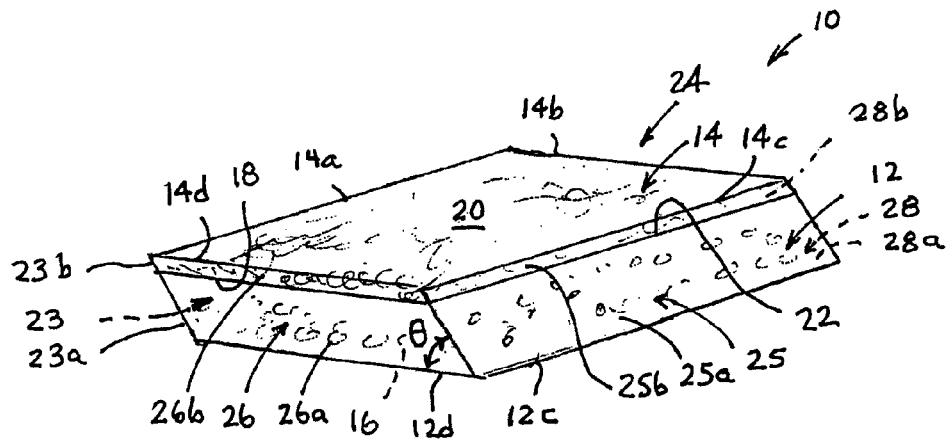
FIG. 1 is a perspective of a sponge product according to the present invention.
Figure 2:
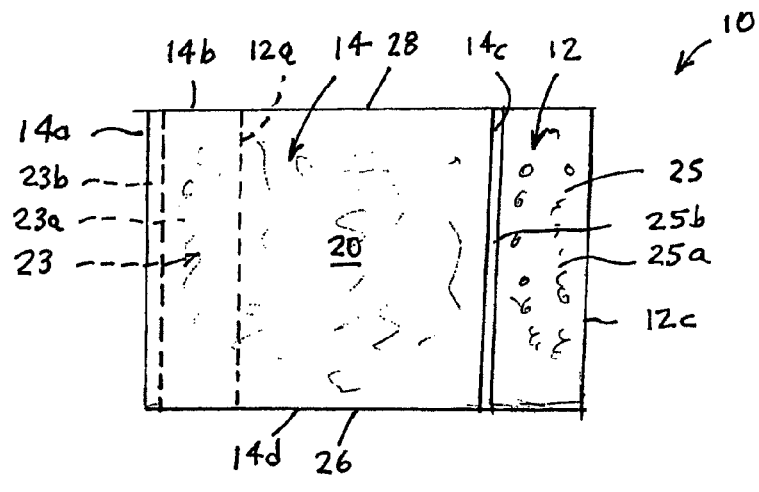
FIG. 2 is a top plan view of the sponge product shown in FIG. 1.
Figure 3:
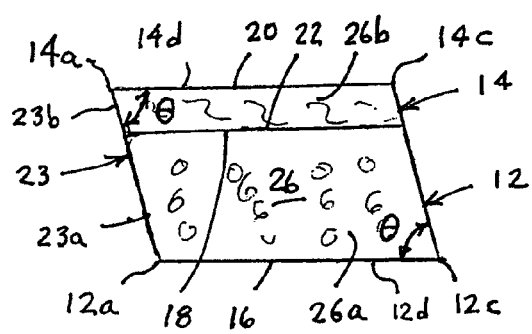
FIG. 3 is a side view of the sponge product shown in FIG. 1.

Now, and with reference to the drawings, there is depicted therein a sponge product 10 according to this invention. The sponge product 10, preferably, comprises a foraminous portion or layer 12 and an abrasive portion or layer 14, each portion in side elevation or cross-section is in the form or a parallelogram shaped body, and the portions 12 and 14 joined to form a unitary block 24, which in side elevation or cross-section is in the form of a parallelogram shaped body having a top surface 20, a bottom surface 16, front and rear faces 23 and 25, and planar parallelogram shaped sidewalls 26 and 28. The surfaces 16, 20, 23, and 25 are generally planar and rectangular shaped.

The top and bottom surfaces 20 and 16 are generally parallel to one another and form exterior cleaning surfaces of the sponge product. The top surface 20 of the abrasive portion 14 is used for scrubbing. Preferably, the surfaces 16 and 20 are relatively close to one another to provide a low profile sponge body capable of reaching into hard to clean areas. The bottom surface 16 of the foraminous portion 12 is used for less aggressive cleaning wherein the quality of the surface is a concern and also for absorbing fluids. The terms top and bottom and/or upper and lower are relative and depend on how the sponge is oriented in use. The terms are used herein as a means of describing structure in the drawing figures.

The front and rear faces 23 and 25 are generally parallel to one another and at an acute angle $\theta$ to the top and bottom faces 20 and 16. Together with the surfaces 16 and 20, the surfaces form wedges at the opposite ends of the sponge 10. Depending on the manner that the sponge product is held and the positioning of the foraminous and abrasive portions 12 and 14 for surface cleaning and use initiated, the front face 23 may be the rear face and the rear face 25 the front face.

The sidewalls 26 and 28 are generally planar and. Parallel to one another and generally at a right angle to the surfaces 20, 25, 16, and 23 that form the parallelogram shape of the block 24. In some applications, the sidewalls 26 and 28 may be at an acute angle to the surfaces 20 and 16 and form in side elevation or cross-section a parallelogram shape.

The foraminous portion 12 has the lower surface 16 and an upper surface 18, laterally spaced sidewalls 26a and 28a, and from and rear walls 23a and 25a.

The abrasive portion 14 has the upper surface 20 and a bottom surface 22, laterally spaced sidewalls 26b and 28b, and front and rear walls 23b and 25b.

The surfaces 18 and 22 are joined together by any suitable means, such by sonic welding, gluing, flame laminating or the like to form a unitary product in the form of the parallelogram shaped block 24. So joined, the sidewall 26 is formed by the sidewalls 26a and 26b, the sidewall 28 is formed by the sidewalls 28a and 28b, the inclined front wall (or wedge) 23 is formed by the wall portions 23a and 23b, and the inclined rear wall (or wedge) 25 is formed by the wall portions 25a and 25b. When the portions 12 and 14 are joined, the walls 23a, 28a, 25a and 28a of the foraminous portion 12 and the walls 23b, 28b, 25b, and 28b of the abrasive portion 14 form generally continuous planar surfaces, as shown in the drawings.

As shown in the drawings, the front and rear walls 23 and 25 of the parallelogram shape are inclined and at an acute angle 0 with respect to the bottom surface 16 and top surface 20. The angle 0 is less than 90° and, depending on the application, the angle 0 is about between 35° and 70°, and preferably, as shown, about 60°.

Additionally, so joined into the parallelogram shaped block 24, the sponge and abrasive portions or layers 12 and 14 of the sponge product 10 form a plurality of edges 12a, 12b, 12c, and 12d and 14a, 14b. 14c, and 14d. The sponge product 10 and the respective edges of the foraminous and abrasive portions 12 and 14 can effectively be brought into contact with an edge or corner of a surface to either scrub the surface via the abrasive portion or simply clean or absorb fluid through the foraminous portion.

Preferably, the sponge is dimensioned to enable a user to grip the sponge by the sidewalls 26 and 28 and maneuver the body 24 as desired.

The foraminous or sponge-type portion typically comprises a polyurethane foam and, more particularly, an open-celled hydrophilic, polyurethane foam. The actual manufacture of these foams is well known in the art.

For example, in U.S. Pat. Nos. 6,841,586 and 6,855,741, the disclosures of which are hereby incorporated by reference there is disclosed therein the manufacture of useful polyester polyol-based polyurethane foams. Typically, these foams utilize suitable polyester polyols such as those produced by reacting a dicarboxylic and/or monocarboxylic acid with an excess of a diol and/or polyhydroxy alcohol, for example, adipic acid, glutaric acid, succinic acid, phthalic acid or anhydride, and/or fatty acids (linolic acid, oleic acid and the like) with diethylene glycol, ethylene glycol, propylene glycol, dipropylene glycol, 1,4-butanediol, neopentyl glycol, trimethylolpropane, trimethylolethane, and/or pentaerythritol Examples of these polyols are LEXOREZ 1102-50 or LEXOREZ 1102-60 from Molex Chemical Company or FOMREZ 50 or FOMREZ 60 from Crompton Corporation. Other suitable polyester polyols can be prepared by reacting a lactone with an excess of a diol such as caprolactone with propylene glycol. Sec U.S. Pat. No. 4,331,555 for father discussion of suitable polyester polyols, the disclosure of which is hereby incorporated by reference.

Generally, however, these polyester polyurethane foams are prepared from the reaction of a hydrophilic polyester polyol and a polyisocyanate. Hydrophilic ester polyols are typically reaction products of polyethylene glycol and adipic acid. Examples are FOMREZ 45 from Crompton and LEXOREZ 1105-HV2 from Inolex Chemical Company.

The "hydroxyl number" for a polyol is a measure of the amount of reactive hydroxyl groups available for reaction. The value is reported as the number of milligrams of potassium hydroxide equivalent to the hydroxyl groups found in one gram of the sample. "Functionality" of a polyol is defined as the average number of hydroxyl group sites per molecule. Preferably, the polyester polyols ordinarily used to form the foams have a hydroxyl number in the range of 20 to 150, more preferably, in the range of 40 to 100, and most preferably in the range of 50 to 60.

The term "polyisocyanate" refers particularly to isocyanates that have previously been suggested for use in preparing polyurethane foams. "Polyisocyanates" include di- and poly-isocyanates and prepolymers of polyols and polyisocyanates having excess isocyanate groups available to react with additional polyol. The amount of polyisocyanate employed is frequently expressed by the term "index", which refers to the actual amount of isocyanate required for reaction with all of the active hydrogen-containing compounds present in the reaction mixture multiplied by 100. For most foam applications, the isocyanate index is in the range of between about 75 to 140.

The polyester polyurethane foams are prepared using any suitable organic polyisocyanates well known in the art including, for example, hexamethylene diisocyanate, phenylene diisocyanate, toluene diisocyanate (TDI) and 4,4'-diphenyl-methane diisocyanate (MDI). The methylene diisocyanates suitable for use are diphenyl methane diisocyanate and polymethylene polyphenyl isocyanate blends (sometimes referred to as "MDI" or "polymeric MDI"). The MDI blends can contain diphenylmethane 4,4' diisocyanate, as well as 2,2'- and 2,4'-isomers and higher molecular weight oligomers and have an isocyanate functionality of from about 2.1 to 2.7, preferably from about 2.1 to 2.5. Preferably, the isocyanate is selected from a commercial mixture of 2,4- and 2,6-toluene diisocyanate. A well-known commercial toluene diisocyanate is TD80, a blend of 80% 24-toluene diisocyanate and 20% 26-toluene diisocyanate. Polyisocyanates are typically used at a level of between 20 and 90 parts by weight per 100 parts of polyol, depending upon the polyol OH content and water content of the formulation.

One or more surfactants may also be employed in the foam-forming composition. The surfactants lower the bulk surface tension, promote nucleation of bubbles, stabilize the rising cellular structure, emulsify incompatible ingredients, and may have some effect on the hydrophilicity of the resulting foam. The surfactants typically used in polyurethane foam applications are polysiloxane-polyoxyalkylene copolymers, which are generally used at levels between about 0.5 and 3 parts by weight per 100 parts polyol. In the present invention, from 1.0 to 3.0 parts by weight per 100 parts polyol of surfactant is preferred. Surfactants, which may for example be organic or silicone based, such as FOMREZ M66-86A (Witco) and L532 (Osi Specialties) may be used to stabilize the cell structure, to act as emulsifiers and to assist in mixing. Most preferably, the surfactant is a cell opening silicone surfactant in an amount from 1.5 to 2.5 parts by weight per 100 parts polyol.

Catalysts are used to control the relative rates of water-polyisocyanate (gas-forming or blowing) and polyol-polyisocyanate (gelling) reactions. The catalyst may be a single component, or in most cases a mixture of two or more compounds. Preferred catalysts for polyurethane foam production are organotin salts and tertiary amines. The amine catalysts are known to have a greater effect on the water-polyisocyanate reaction, whereas the organotin catalysts are known to have a greater effect on the polyol-polyisocyanate reaction. The amount of catalyst used depends upon the formulation employed and the type of catalyst, as known to those skilled in the art.

Suitable urethane catalysts are all those well known to the worker skilled in the art, including tertiary amines such as triethylenediamine, N-methylimidazole, 2-dimethylimidazole, N-methylmorpholine, N-ethylmorpholine, triethylamine, tributylamine, triethanolamine, dimethylethanolamine and bisdimethylaminodiethylether, and organotins such as stannous octoate, stannous acetate, stannous oleate, stannous laurate, dibutyltin dilaurate and dibutyltin bis(2-ethylhexanoate), and other such tin salts. Other useful catalysts include tin 2-ethylcaproate, tin naphthoate, tin octylate and the like. These catalysts may be used singly or in combination and it may be more effective to use an amine together with an organometallic compound or an organic acid salt of a metal. Catalysts should be present at about 0.0001 to about 5 weight percent of the reaction mixture.

Other useful amines which may be used as the catalyst in the present invention include, for example, trialkylamines, such as triethylene amine; N,N,N',N'-tetramethyl-1,3-butanediamine; amino alcohols such as dimethyl ethanolamine; ester amines such as ethoxylamine, ethoxyldiamine, bis-(diethylethanolamine)adipate; triethylenediamine; cyclohexylamine derivatives such as N,N-dimethylcyclohexylamine; morpholine derivative such as N-methylmorpholine; and piparazine derivatives such as N,N'-diethyl-2-methylpiparazine, N,N'-bis-(2-hydroxypropyl)-2-methylpiparazine, dimethylaminoethyl)ether and the like.

The catalysts, including 1,3,5-tris-(3-dimethylaminopropyl)-1,3,5-triazine, bis-(3-dimethylaminopropyl)methylamine, potassium acetate, potassium octoate, and DBU, and the methods of use of U.S. Pat. No. 5,539,011 are exemplary and are incorporated herein by reference.

Water is preferably the sole blowing agent to produce carbon dioxide by reaction with the isocyanate. Water is usually used at about 0.1 to about 10 parts per hundred parts of polyol, by weight (pphp), preferably between about 2 and about 8 pphp, more preferably between about 3 and about 6.5 pphp, most preferably between about 3.5 and about 5.8. At foam indexes below 100, the stoichiometric excess of water blows, via vaporization, and cools the foam, and does not take part of the reaction to produce carbon dioxide.

The use of water as the foaming agent in flexible polyurethane foams increases the firmness of the resulting foams. A soft, flexible, plasticized water-blown polyurethane foam composition can be produced from the reaction of a polyol and toluene diisocyanate by adding a plasticizer selected from the group of phthalates, phosphate esters and benzoates to the reaction compounds. The types of plasticizers used in this invention are described in U.S. Pat. No. 5,624,968, the disclosure of which is incorporated by reference herein.

Other blowing agents that are conventionally used in the art may be used herein, such as fluorocarbon compounds, including trichlorofluoromethane, methylene chloride, methyl chloroform, as well as acetone can be included. While the amount of inert blowing material may range from about 0 to about 30 pphp, commercially acceptable foams can generally be made using between about 0 and about 8 pphp, typically between about 0 and about 5 pphp, more typically between about 1 and about 3 pphp.

A double-cell structure may be created to replicate the appearance of natural sea sponges. Materials used to create a double cell structure may be added to the foam forming mixture. These include: castor oil derivatives, stearic acid, acetic acid and low melting point waxes. These materials create voids larger than the prevailing pores within the resulting foam structure. If used, the double-cell additive preferably is added in an amount from 0.04 to 0.21 parts per 100 parts polyol.

Plasticizers which may be used include phthalate plasticizers such as, for example, alkyl aryl phthalates, or a benzyl phthalates, including butyl benzyl phthalate, alkyl benzyl phthalate, preferably wherein the alkyl group has a carbon chain of from seven to nine carbon atoms, Texanol® benzyl phthalate, (which is 2,2,4-trimethyl-1,3-pentanediol-monobutyrate benzyl phthalate), alkyl phenyl phthalate, symmetrical and unsymmetrical dialkyl phthalates including diisononyl phthalate, diisodecyl phthalate, dioctyl phthalate, Di-n-butyl phthalate, Dioctyl phthalate, dihexyl phthalate, diheptyl phthalate, butyloctyl phthalate, linear dialkyl phthalate wherein the alkyl groups are independently carbon chains having from seven to eleven carbon atoms, and butyl cyclohexyl phthalate; phosphate ester plasticizers such as, for example, 2-ethylhexyl diphenyl phosphate, isodecyl diphenyl phosphate, mixed dodecyl and tetradecyl diphenyl phosphate, trioctyl phosphate, tributyl phosphate, butylphenyl diphenyl phosphate and isopropylated triphenyl phosphate; and benzoate plasticizers such as, for example, Texanol® benzoate (which is 2,2,4-trimethyl-1,3-pentanediol-monobutyrate benzoate), glycol benzoate, propylene glycol dibenzoate, dipropylene glycol dibenzoate, and tripropylene glycol dibenzoates.

Also, crosslinker/extenders may be incorporated into the foam formulation. As used herein, the term "crosslinker" is meant to include both compounds generally known as crosslinkers and compounds generally known as chain extenders or simply extenders. Crosslinkers are compounds that contain two or more isocyanate-reactive groups, such as hydroxyl groups, primary amines, and secondary amines.

Effective chain extender or crosslinkers can be from the saccharides, which were found to be generally effective and a preferred class. This class includes sorbitol, sucrose, mannitol, ribose, xylitol, lactose, and fructose. Sorbitol and mannitol are more preferred. These compounds are not soluble in the plasticizer, but these are generally soluble in water and thus can be easily incorporated into the water-blown foam composition.

The polyamines, 4,1'-methylene-bis-(3-chloro-2,6-diethylaniline) (MCDEA) at 0.5 pphp, and amine terminated polyalkylene oxide such as JEFFAMINE® T-403 (Huntsman Co.) are effective. Also, alkanolamines such as triethanolamine, diethanolamine, triisopropanolamine, diisopropanolamine, t-butyltolylenediamine, triaminonane, die thyltolylene diamine, and chlorodiaminobenzene may be used.

Other materials can optionally be added to the polyurethane during production to reduce problems during production or to provide desired properties in the polyurethane product. Among the other additives are fillers including reground polyurethane foam, calcium carbonate, barium sulfate, and the like; UV stabilizers; fire retardants; bacteriostats; cell openers; dyes; and antistatic agents. It is also desirable to include stabilizers and antioxidants such as hindered amine light stabilizers and benzotriazoles.

A cell opening agent, such as a polyethylene oxide monol or polyol of an equivalent weight greater than about 200 with a hydroxyl functionality of two or greater, may be included. For example, one cell opening agent is a polyethylene oxide adduct of glycerol of a molecular weight of about 990 gins/mole, with an equivalent weight of about 330. The cell opening agent should be present at about 0.001 to about 20 pphp.

Solid stabilizing polymers and other additives, including flame retardants, colorants, dyes and anti-static agents, which are conventionally known in the art may be used with the formulations of the present invention. Those additives listed in U.S. Pat. No. 4,950,694 are exemplary and are incorporated herein by reference.

Other fillers and additives such as esters of aliphatic polyhydroxy compounds and unsaturated carboxylic acids may also be used. Examples are acrylates, such as ethylene glycol diacrylate; triethylene glycol diacrylate; tetramethylene glycol diacrylate; trimethylolpropane triacrylate; trimethylolethane triacrylate; pentaerythritol diacrylate; pentaerythritol triacrylate; pentaerythritol tetraacrylate; dipentaerythritol tetraacrylate; dipentaerythritol pentaacrylate; dipentaerythritol hexaacrylate; tripentaerythritol octaacrylate; glycerol diacrylate; methacrylates, such as triethylene glycol dimethacrylate; tetramethylene glycol dimethacrylate; trimethylolpropane trimethacrylate; trimethylolethane trimethacrylate; pentaerythritol dimethacrylate; pentaerythritol trimethacrylate; pentaerythritol tetramethacrylate; dipentaerythritol dimethacrylate; dipentaerythritol trimethacrylate; dipentaerythritol tetramethacrylate; tripentaerythritol octamethacrylate; ethylene glycol dimethacrylate; 1,4-butanediol dimethacrylate; sorbitol tetramethacrylate and the like; itaconates, such as ethylene glycol diitaconate; propylene glycol diitaconate; 1,2-butanediol diitaconate; tetramethylene glycol diitaconate; pentaerythritol triitaconate and the like; crotonates such as ethylene glycol dicrotonate; diethylene glycol dicrotonate; pentaerythritol tetracrotonate and the like; and maleates, such as ethylene glycol dimaleate; triethylene glycol dimaleate; pentaerythritol dimaleate and the like.

An anti-oxidant, such as a hindered phenolic, i.e., IRGANOX® 1010 (Ciba-Geigy), an organic ☐hosphate, or both, may be added to the composition containing the plasticizer. Stabilizers such as tetrabutylhexamethylenediamine are also beneficially added.

The crosslinker/extender additive beneficially improves the integrity of low index foams; meanwhile, the plasticizer would provide good "hand" and physical properties along with improvements to airflow and rebound properties.

The abrasive portion of the product is, preferably, a reticulated foam product. These reticulated foam products are well known and commercially available. Generally, they comprise a reticulated polyurethane foam.

In preparing such reticulated abrasive foams, typically, a slow melt is carried out in the presence of a suitable reticulating agents such as dimethylsulfoxide, dimethylacetamide, formamide dimethylformamide, II-pyrrolidone and I-methyl II-pyrrolidone. These reticulating agents cause a controlled melting of the sponge material during the freeze drying process.

Also, polyether poloyol-based hydrophobic polyurethane foams may be used therein for both the reticulated and non-reticulated portions. Such combined scouring and sponge products are disclosed in the prior art such as in U.S. Pat. No. 3,861,993, the disclosure of which is hereby incorporated by reference.

In practicing the present invention a particularly preferred polyurethane foam to be used herein is that which is sold by Armaly Brand Products under the trademark Estracell. Estracell is a synthetic polyurethane polyester polyurethane foam which does not support bacterial growth thereby providing a longer useful life for the product.

It should be further noted that in practicing the present invention the sponge or base portion hereof can be a cellulosic material and the abrasive portion can be a non-woven fiber which is either glued or flame laminated to the cellulosic or cellulose portion.

Representative abrasive materials include, for example, polyester fibers, polyethylene fibers, polypropylene fibers, nylon with or without aluminum oxide being incorporated therewith, and so forth.

A particularly preferred product comprises an Estracell polyurethane sponge portion and a non-woven fiber nylon abrasive material adhered thereto by flame laminating, extrusion or with a suitable adhesive.

The sponge product 10 described hereinabove provides the user with a multi-surface scrub sponge product having a low profile shape and oppositely directed wedges that reach deep into hard-to-get-to corners and crevices as well as clean contoured and in transitions between surfaces. The multi-surface scrub material 12 and 14 is designed to clean most surfaces and is particularly advantageous in removing build up in hard to reach places, such as on a stove, around a sink, bathroom and other hard to clean places found around the home. In one application using ESTRACELL®, the abrasive portion 14 provides a heavy duty aggressive scour surface that removes burned on foods and grease from cast iron pots and pans. The foraminous or sponge side portion 12 reaches in and easily wipes up and rinses dirt and food particles and may also be used on non-stick grill tops.

It is to be readily appreciated from the preceding that there has been described herein a cleaning device, which enables effective cleaning of edges and corners.

What is claimed is:

1. A sponge product for cleaning a work surface, comprising:
   a foraminous body layer having an upper surface and an opposed lower surface in parallel spaced relation to one another, a front wall and opposed rear wall that are parallel to one another, and a first sidewall and opposed second sidewall, wherein at least one of the front wall, rear wall, first sidewall or second sidewall is inclined and at an acute angle relative to the upper surface of the body layer, and
   an abrasive layer adjacent only to the upper surface of the foraminous body layer and attached thereto to form a unitary product, wherein the abrasive layer is selected from a material comprised of a reticulated abrasive foam or a nonwoven fibrous mass, and the abrasive layer has an upper surface and an opposed lower surface that are parallel to one another, a front wall and an opposed rear wall that are parallel to one another, and a first sidewall and an opposed second sidewall, and at least one of the front wall, rear wall, first sidewall or second sidewall of the abrasive layer form an obtuse angle with the lower surface of the abrasive layer, and the abrasive layer upper surface and at least one front wall, rear wall, first sidewall or second sidewall forms a working edge having an acute angle, such that the working edge remains flat against the work surface when a force is applied to the sponge product.

2. The sponge product of claim 1, wherein the abrasive layer has a parallelogram shape and the sponge product has a parallelogram shape.

3. The sponge product of claim 1, wherein at least one of the abrasive layer front wall, rear wall, first sidewall or second sidewall is inclined and at an acute angle relative to the inclined front wall, rear wall, first sidewall or second sidewall of the of the foraminous body layer to form a continuous angled sponge wall such that a second working edge is formed in the foraminous layer along an opposed edge to the first working edge.

4. The sponge product of claim 1, wherein the acute angle is about 30°.

5. The sponge product of claim 1 wherein the acute angle is about 60°.

6. The sponge product of claim 1, wherein the foraminous body layer comprises an open-celled hydrophilic polyurethane foam.

7. The sponge product of claim 6, wherein the polyurethane foam is a polyester polyol-based polyurethane foam.

8. The sponge product of claim 6, wherein the abrasive layer is selected from the group consisting of polyester fibers, polyethylene fiber, polypropylene fiber, nylon fibers and a reticulated foam.

9. The sponge product of claim 6, wherein the abrasive layer is a non-woven nylon fiber.

10. The sponge product of claim 1 wherein a shape of the sponge is rhomboidal.

11. The sponge product of claim 1 wherein a shape of the sponge is a quadrilateral.

12. A sponge product for cleaning a work surface, comprising:

a foraminous body layer having an upper surface and an opposed lower surface in parallel spaced relation to one another, a front wall and opposed rear wall that are parallel to one another, and a first sidewall and opposed second sidewall, wherein at least one of the front wall, rear wall, first sidewall or second sidewall is inclined and at an acute angle relative to the upper surface of the body layer, and an abrasive layer adjacent only to the upper surface of the foraminous body layer and attached thereto to form a unitary product, wherein the abrasive layer is selected from a material group consisting of polyester fibers, polyethylene fiber, polypropylene fiber, nylon fibers and a reticulated foam, and the abrasive layer has an upper surface and an opposed lower surface that are parallel to one another, a front wall and an opposed rear wall that are parallel to one another, and a first sidewall and an opposed second sidewall, and at least one of the front wall, rear wall, first sidewall or second sidewall of the abrasive layer form an obtuse angle with the lower surface of the abrasive layer, and the abrasive layer upper surface and at least one front wall, rear wall, first sidewall or second sidewall forms a working edge having an acute angle, such that the working edge remains flat against the work surface when a force is applied to the sponge product.

13. A sponge product for cleaning a work surface, comprising:

a foraminous body layer having an upper surface and an opposed lower surface in parallel spaced relation to one another, a front wall and opposed rear wall that are parallel to one another, and a first sidewall and opposed second sidewall, wherein at least one of the front wall, rear wall, first sidewall or second sidewall is inclined and at an acute angle relative to the upper surface of the body layer, and an abrasive layer adjacent only to the upper surface of the foraminous body layer and attached thereto to form a unitary product, wherein the abrasive layer is selected from a material comprised of a nonwoven serous fibrous mass, and the abrasive layer has an upper surface and an opposed lower surface that are parallel to one another, a front wall and an opposed rear wall that are parallel to one another, and a first sidewall and an opposed second sidewall, and at least one of the front wall, rear wall, first sidewall or second sidewall of the abrasive layer form an obtuse angle with the lower surface of the abrasive layer, and the abrasive layer upper surface and at least one front wall, rear wall, first sidewall or second sidewall forms a working edge having an acute angle, such that the working edge remains flat against the work surface when a force is applied to the sponge product.

14. The sponge product of claim 13, wherein the nonwoven fibrous mass is a non-woven nylon fiber.

\* \* \* \* \*